United States Patent
Grahl et al.

(10) Patent No.: US 10,815,330 B2
(45) Date of Patent: Oct. 27, 2020

(54) THERMOLATENTLY CATALYSED TWO-COMPONENT SYSTEM

(71) Applicant: COVESTRO DEUTSCHLAND AG, Leverkusen (DE)

(72) Inventors: Michael Grahl, Leverkusen (DE); Uwe Klippert, Burscheid (DE); Frank Richter, Leverkusen (DE); Sven Siegemund, Burscheid (DE); Jan Weikard, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 92 days.

(21) Appl. No.: 16/093,819

(22) PCT Filed: Apr. 18, 2017

(86) PCT No.: PCT/EP2017/059111
§ 371 (c)(1),
(2) Date: Oct. 15, 2018

(87) PCT Pub. No.: WO2017/182429
PCT Pub. Date: Oct. 26, 2017

(65) Prior Publication Data
US 2019/0135968 A1     May 9, 2019

(30) Foreign Application Priority Data
Apr. 22, 2016  (EP) ..................... 16166720

(51) Int. Cl.
| C08G 18/24 | (2006.01) |
| C08G 18/62 | (2006.01) |
| C08G 18/79 | (2006.01) |
| C09D 175/04 | (2006.01) |
| C08G 18/28 | (2006.01) |

(52) U.S. Cl.
CPC ....... C08G 18/246 (2013.01); C08G 18/6225 (2013.01); C08G 18/792 (2013.01); C09D 175/04 (2013.01)

(58) Field of Classification Search
CPC ................................... C08G 18/24
USPC .................................... 528/5, 58
See application file for complete search history.

(56) References Cited

U.S. PATENT DOCUMENTS

| 4,788,083 A | 11/1988 | Dammann et al. |
| 5,041,239 A | 8/1991 | Rörig et al. |
| 6,046,270 A | 4/2000 | Roesler et al. |
| 6,403,699 B1 | 6/2002 | Röckrath et al. |
| 7,053,149 B2 | 5/2006 | Anderson et al. |
| 8,946,372 B2 * | 2/2015 | Richter ................ B01J 31/0201 528/53 |
| 9,267,054 B2 | 2/2016 | Wegner et al. |
| 2003/0027921 A1 | 2/2003 | Speier et al. |
| 2003/0199663 A1 | 10/2003 | Gerkin et al. |
| 2010/0324340 A1 | 12/2010 | Pazos et al. |
| 2011/0054140 A1 | 3/2011 | Krause et al. |
| 2011/0293842 A1 | 12/2011 | Flosbach et al. |
| 2012/0220717 A1 | 8/2012 | Richter et al. |
| 2012/0237688 A1 | 9/2012 | Huybrechts et al. |
| 2015/0240024 A1 | 8/2015 | Richter et al. |
| 2015/0252138 A1 | 9/2015 | Richter et al. |

FOREIGN PATENT DOCUMENTS

| EP | 0008127 A1 | 2/1980 |
| EP | 0249201 A2 | 12/1987 |
| EP | 0709415 A2 | 1/1996 |
| EP | 2772496 A1 | 9/2014 |
| EP | 2990381 A1 | 3/2016 |
| WO | 9712945 A1 | 4/1997 |
| WO | 2005058996 A1 | 6/2005 |

OTHER PUBLICATIONS

Chernov et al.; Journal of Organometallic Chemistry; "Heteroleptic tin (II) dialkoxides stabilized by intramolecular coordination Sn(OCH2CH2NMe2)(OR) (R = Me, Et, iPr, tBu, Ph). Synthesis, structure and catalytic activity in polyurethane synthesis"; 2009; vol. 694, issue 19; pp. 3184-3189.
Journal of Heterocyclic Chemistry; 2006; vol. 43, issue 4; pp. 813-834.
Indian Journal of Chemistry; 1967 vol. 5; pp. 643-645.
Römpp Lexicon "Lacke and Druckfarben" [Coatings and Printing Inks] Georg Thieme Verlag, Stuttgart, 1998, pp. 250 to 252.

* cited by examiner

Primary Examiner — Duc Truong
(74) Attorney, Agent, or Firm — John E. Mrozinski, Jr.

(57) ABSTRACT

The invention relates to a two-component system containing a component A) comprising at least one NCO-reactive connection, and a component B) comprising at least one polyisocyanate, characterised in that the component A) contains ≥400 to ≤9500 wt. ppm water, in relation to the total weight of the component A), and the component A) and/or the component B) contains at least one thermolatent, inorganic, tin-containing catalyst. The invention also relates to a method for producing a coating on a substrate, coatings that can be obtained with the method, the use of the component A) or B) in the two-component system, and substrates coated with the coating, in particular coated vehicle bodies or vehicle parts.

19 Claims, No Drawings

THERMOLATENTLY CATALYSED TWO-COMPONENT SYSTEM

This application is a national stage application (under 35 U.S.C. § 371) of PCT/EP2017/059111 filed Apr. 18, 2017, which claims the benefit of European Application No. EP16166720.9 filed Apr. 22, 2016.

The present invention relates to a two-component system, to a process for producing a coating on a substrate, in particular on automobile bodies or automobile parts, and to coatings obtainable by the process. The invention further relates to the use of the component A) or B) in the two-component system and to substrates coated with the coating, in particular coated automobile bodies or automobile parts.

Polyurethane coatings have been known for a long time and are used in many sectors. They are generally produced from a hydroxyl component (component A) and a polyisocyanate component (component B) by mixing immediately before application (two-component technology).

The hydroxyl component in two-component systems is subject to general specifications in respect of water content and thus solvents having a water content of not more than 500 ppm are specified as being suitable for polyurethane chemistry.

However, normally water contents markedly below 500 ppm are sought since the water content of the hydroxyl component affects the change in stoichiometry of the curing reaction of the lacquer. In a two-component polyurethane clearcoat for plastics lacquering for example this manifests as follows: cross-linking ratio 100 parts of polyol component to 35 parts of hardener. Equivalent weight of hardener as delivered (NCO): 306 g. 875 g of polyol component are to be used per equivalent of hardener. At a water content of 1000 ppm, 0.875 g, corresponding to 0.05 mol, of water are present. This corresponds to a theoretical loss of isocyanate groups (NCO groups), by reaction with water to afford the amine, of 5%. The same amount again of NCO groups may theoretically be consumed by subsequent urea formation and the total loss of NCO groups is therefore up to 10%.

At higher NCO losses by reaction with water the stoichiometry of the crosslinking would already be influenced to an unacceptable extent so that in practice the water content in the polyol component is kept below 500 ppm or at most below 1000 ppm.

WO 2013/076208 A1 discloses a solvent-containing clearcoat coating composition composed of a polyacrylate component and a crosslinker component having a very low water content of not more than 1% by weight based on the total amount of the composition. However, WO 2013/076208 A1 specifies the water content only as a definition of the therein-used term "solvent-containing" and does not elaborate on the crosslinking reaction.

Lightfast coatings generally employ polyisocyanate components based on aliphatic polyisocyanates which react with the hydroxyl component much more slowly compared to products having aromatically bonded isocyanate groups. The reaction must therefore be catalyzed in most cases. In addition, the mixture is heated where possible for further acceleration of the reaction. Catalysts which have proven advantageous here are organic tin compounds, in particular dibutyltin dilaurate (DBTL). These have the general disadvantage of a deleterious ecological profile which has for example already led to the substance class of organotin compounds to be completely banned from marine coatings, to which they were added as a biocide.

Since the crosslinking reaction between the isocyanate group and the NCO-reactive group proceeds slowly, and markedly more quickly with catalysis, even at room temperature only a narrow use window (pot life) remains for the use of the ready-formulated mixture of a two-component system and this is further shortened by the presence of the catalyst.

A further important aspect in spray painting, in particular with solvent-containing clearcoats, is the appearance of the lacquer after curing. Said appearance is determined substantially in the flow phase, when the still-wet lacquer forms a film on the substrate, and in the first period of drying when the lacquer material emits the solvents as a result heating in the oven and the incipient crosslinking reaction forms an uninterrupted film.

There has been no shortage of attempts to develop catalysts which hardly accelerate the crosslinking reaction after mixing of the two components but markedly accelerate said reaction after application. Thus, WO 2011/051247 A1 describes polyisocyanate polyaddition products for use inter alia in the coatings sector in which polyisocyanates are reacted with NCO-reactive compounds in the presence of a thermolatent inorganic tin-containing catalyst. However, even this cannot ensure for all two-component systems a reproducibly extended pot life compared to customarily used catalysts, in particular DBTL, as is required for coating compositions.

It is accordingly an object of the present invention to provide a two-component system which upon mixing of components A) and B) exhibits a reproducibly extended pot life for the coating of a substrate without adversely affecting the catalytic activity of the thermolatent catalyst for curing the applied two-component system by increasing the temperature. It should also be ensured that the physical properties, in particular the development of hardness, of the coatings obtainable from the two-component system are at least equivalent to the coatings produced with non-thermolatent catalysts and known from the prior art.

This object was solved in accordance with the invention by a two-component system containing a component A) comprising at least one NCO-reactive compound and a component B) comprising at least one polyisocyanate, characterized in that the component A) contains ≥400 to ≤9500 ppmw of water based on the total weight of the component A) and the component A) and/or the component B) contains at least one thermolatent inorganic tin-containing catalyst.

It was found that, surprisingly, a certain amount of water, preferably an amount of water in excess of the limit specified for polyurethane chemistry, in the component A) results in a markedly extended pot life in two-component systems containing a thermolatent inorganic tin-containing catalyst without the later catalyzing action on curing being impaired. At the same time the physical properties of the obtained coating, in particular the development of hardness, are maintained at least at the same level.

In a first preferred embodiment the component A) contains ≥501 to ≤6500 ppmw, preferably ≥700 to ≤5000 ppmw, particularly preferably ≥1001 to ≤4000 ppmw and very particularly preferably ≥1400 to ≤2400 ppmw of water based on the total weight of the component A). This has the advantage that the pot life is further extended and the thermolatent action of the thermolatent catalyst is further amplified. In addition, the lacquer appearance of the produced coating is further improved and the application of the two-component system is further facilitated.

In the context of the invention the water content is determined by Karl Fischer titration as a volumetric method according to DIN 53715 (DIN 53715 was based on DIN 51777 part 1 (1973 edition). The measurement range of the water content is 0.01%-<99% by weight.

In the context of the invention, the pot life is defined as the time within which paint has doubled its viscosity (determined indirectly by doubling the efflux time in the DIN cup, 4 mm).

According to the invention it is provided that at least the component A) and preferably only the component A) of the two-component system contains water in the abovementioned quantity ranges. This water may be introduced into the component A) by any desired route and these routes may also complement one another in order to achieve the required total amount of water in the component A). For example appropriate amounts of water may be introduced as a consequence of production via the compounds present in the component A), in particular the NCO-reactive compound. It is likewise possible to add water to the component A) itself.

In a further preferred embodiment the water in the component A) has been separately added and/or is present in the NCO-reactive compound as a consequence of production.

According to the invention the expressions "comprising" or "containing" preferably mean "consisting essentially of" and particularly preferably "consisting of".

According to the invention the component A) comprises at least one NCO-reactive (isocyanate-reactive) compound. An NCO-reactive compound is understood to mean a compound that can react with polyisocyanates to give polyaddition compounds, especially polyurethanes. In the context of the invention, polyisocyanates are compounds having at least two isocyanate groups per molecule.

NCO-reactive compounds used may be any compounds known to those skilled in the art that have a mean OH or NH functionality of at least 1.5. These may, for example, be low molecular weight diols (e.g. ethane-1,2-diol, propane-1,3- or -1,2-diol, butane-1,4-diol), triols (e.g. glycerol, trimethylolpropane) and tetraols (e.g. pentaerythritol), short-chain polyamines, but also polyhydroxy compounds such as polyether polyols, polyester polyols, polyurethane polyols, polysiloxane polyols, polycarbonate polyols, polyether-polyamines, polybutadiene polyols, polyacrylate polyols and/or polymethacrylate polyols and copolymers thereof, called polyacrylate polyols hereinafter.

In a further preferred embodiment the NCO-reactive compound is a polyhydroxyl compound.

The polyhydroxyl compounds preferably have mass-average molecular weights Mw>500 daltons, measured by means of gel permeation chromatography (GPC) against a polystyrene standard, more preferably between 800 and 100 000 daltons, especially between 1000 and 50 000 daltons.

The polyhydroxyl compounds preferably have an OH number of 30 to 400 mg KOH/g, especially between 100 and 300 KOH/g. The hydroxyl number (OH number) indicates how many mg of potassium hydroxide are equivalent to the amount of acetic acid bound by 1 g of substance in the acetylation. In the determination, the sample is boiled with acetic anhydride/pyridine, and the acid formed is titrated with potassium hydroxide solution (DIN 53240-2).

The glass transition temperatures, measured with the aid of DSC measurements according to DIN EN ISO 1 1357-2, of the polyhydroxyl compounds are preferably between −150 and 100° C., more preferably between −120° C. and 80° C.

Polyether polyols are obtainable in a manner known per se, by alkoxylation of suitable starter molecules under base catalysis or using double metal cyanide compounds (DMC compounds). Suitable starter molecules for the production of polyether polyols are, for example, simple low molecular weight polyols, water, organic polyamines having at least two N—H bonds, or any desired mixtures of such starter molecules.

Preferred starter molecules for production of polyether polyols by alkoxylation, especially by the DMC process, are especially simple polyols such as ethylene glycol, propylene 1,3-glycol and butane-1,4-diol, hexane-1,6-diol, neopentyl glycol, 2-ethylhexane-1,3-diol, glycerol, trimethylolpropane, pentaerythritol, and low molecular weight hydroxyl-containing esters of such polyols with dicarboxylic acids of the type specified hereinafter by way of example, or low molecular weight ethoxylation or propoxylation products of such simple polyols, or any desired mixtures of such modified or unmodified alcohols. Alkylene oxides suitable for the alkoxylation are especially ethylene oxide and/or propylene oxide, which can be used in the alkoxylation in any sequence or else in a mixture.

Suitable polyester polyols are described, for example, in EP-A-0 994 1 17 and EP-A-1 273 640. Polyester polyols can be produced in a known manner by polycondensation of low molecular weight polycarboxylic acid derivatives, for example succinic acid, adipic acid, suberic acid, azelaic acid, sebacic acid, dodecanedioic acid, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimer fatty acid, trimer fatty acid, phthalic acid, phthalic anhydride, isophthalic acid, terephthalic acid, citric acid or trimellitic acid, with low molecular weight polyols, for example ethylene glycol, diethylene glycol, neopentyl glycol, hexanediol, butanediol, propylene glycol, glycerol, trimethylolpropane, 1,4-hydroxymethylcyclohexane, 2-methylpropane-1,3-diol, butane-1,2,4-triol, triethylene glycol, tetraethylene glycol, polyethylene glycol, dipropylene glycol, polypropylene glycol, dibutylene glycol and polybutylene glycol, or by ring-opening polymerization of cyclic carboxylic esters such as ε-caprolactone. In addition, it is also possible to polycondense hydroxycarboxylic acid derivatives, for example lactic acid, cinnamic acid or ω-hydroxycaproic acid to give polyester polyols. However, it is also possible to use polyester polyols of oleochemical origin. Such polyester polyols can be produced, for example, by full ring-opening of epoxidized triglycerides of an at least partly olefinically unsaturated fatty acid-containing fat mixture with one or more alcohols having 1 to 12 carbon atoms and by subsequent partial transesterification of the triglyceride derivatives to alkyl ester polyols having 1 to 12 carbon atoms in the alkyl radical.

Polyurethane polyols are preferably produced by reaction of polyester polyol prepolymers with suitable di- or polyisocyanates and are described, for example, in EP-A-1 273 640. Suitable polysiloxane polyols are described, for example, in WO-A-01/09260, and the polysiloxane polyols cited therein can preferably be used in combination with further polyhydroxyl compounds, especially those having higher glass transition temperatures.

The polyacrylate polyols that are very particularly preferred in accordance with the invention are generally copolymers and preferably have mass-average molar masses Mw between 1000 and 20 000 daltons, especially between 5000 and 10 000 daltons, measured in each case by means of gel permeation chromatography (GPC) against a polystyrene standard. The glass transition temperature of the copolymers is generally between −100° C. and 100° C., especially between −50° C. and 80° C. (measured by means of DSC measurements according to DIN EN ISO 1 1357-2).

The polyacrylate polyols preferably have an OH number of 60 to 250 mg KOH/g, especially between 70 and 200 KOH/g, and an acid number between 0 and 30 mg KOH/g. The acid number here indicates the number of mg of potassium hydroxide which is used for neutralization of 1 g of the respective compound (DIN EN ISO 21 14).

The production of suitable polyacrylate polyols is known per se to those skilled in the art. They are obtained by free-radical polymerization of olefinically unsaturated monomers having hydroxyl groups or by free-radical copolymerization of olefinically unsaturated monomers having hydroxyl groups with optionally other olefinically unsaturated monomers, for example ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or especially cyclohexyl acrylate and/or cyclohexyl methacrylate. Suitable olefinically unsaturated monomers having hydroxyl groups are especially 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate and especially 4-hydroxybutyl acrylate and/or 4-hydroxybutyl methacrylate.

Further monomer units used for the polyacrylate polyols may be vinylaromatic hydrocarbons, such as vinyltoluene, alpha-methylstyrene or especially styrene, amides or nitriles of acrylic acid or methacrylic acid, vinyl esters or vinyl ethers, and in minor amounts especially acrylic acid and/or methacrylic acid.

According to the invention the component B) comprises at least one polyisocyanate.

Polyisocyanates used here may in principle be any polyisocyanates known to the person skilled in the art to be suitable for the production of polyisocyanate polyaddition products, especially polyurethanes, especially the group of the organic aliphatic, cycloaliphatic, araliphatic and/or aromatic polyisocyanates having at least two isocyanate groups per molecule and mixtures thereof. Examples of polyisocyanates of this kind are di- or triisocyanates, for example butane 1,4-diisocyanate, pentane 1,5-diisocyanate (pentamethylene diisocyanate, PDI), hexane 1,6-diisocyanate (hexamethylene diisocyanate, HDI), 4-isocyanatomethyloctane 1,8-diisocyanate (triisocyanatononane, TIN), 4,4'-methylenebis(cyclohexyl isocyanate) (H$_{12}$MDI), 3,5,5-trimethyl-1-isocyanato-3-isocyanatomethylcyclohexane (isophorone diisocyanate, IPDI), 1,3- and 1,4-bis(isocyanatomethyl)cyclohexane (H$_6$XDI), naphthalene 1,5-diisocyanate, diisocyanatodiphenylmethane (2,2'-, 2,4'- and 4,4'-MDI or mixtures thereof), diisocyanatomethylbenzene (toluylene 2,4- and 2,6-diisocyanate, TDI) and technical grade mixtures of the two isomers, and also 1,3- and/or 1,4-bis(isocyanatomethyl) benzene (XDI), 3,3'-dimethyl-4,4'-biphenyl diisocyanate (TODI), paraphenylene 1,4-diisocyanate (PPDI) and cyclohexyl diisocyanate (CHDI) and the oligomers of higher molecular weight that are obtainable individually or in a mixture from the above and have biuret, uretdione, isocyanurate, iminooxadiazinedione, allophanate, urethane and carbodiimide/uretonimine structural units. Preference is given to using polyisocyanates based on aliphatic and cycloaliphatic diisocyanates.

In a particular embodiment of the invention, the polyisocyanate present in the component B) is an aliphatic and/or cycloaliphatic polyisocyanate.

In another preferred embodiment of the invention, the polyisocyanate present in the component B) is a derivative of hexamethylene diisocyanate and/or of pentamethylene diisocyanate, especially a hexamethylene diisocyanate trimer and/or a pentamethylene diisocyanate trimer.

It is preferable when the ratio of polyisocyanates to NCO-reactive compounds in the two-component system, based on the molar amounts of the isocyanate groups relative to the NCO-reactive groups, is from 0.8:1.0 to 2.0:1.0. Particular preference is given to a ratio of 1.0:1.0 to 1.5:1.0 Very particular preference is given to a ratio of 1.05:1.0 to 1.25:1.0

Component A) and/or B) of the two-component system according to the invention contains at least one thermolatent inorganic tin-containing catalyst. In this context the term "inorganic" is to be understood as meaning that the compounds to be used as the thermolatent inorganic tin-containing catalyst do not have a direct tin-carbon bond. In the context of the present invention "thermolatent inorganic tin-containing catalyst" is especially understood to mean any catalyst that does not have a direct tin-carbon bond and that does not accelerate or does not significantly accelerate the crosslinking reaction of the at least one polyisocyanate with the at least one NCO-reactive compound to form a urethane bond below 25° C., especially below 30° C., preferably below 40° C., but significantly accelerates it above 60° C., especially above 70° C. "Does not significantly accelerate" here means that below 25° C., in particular below 30° C., preferably below 40° C., the presence of the thermolatent catalyst in the coating does not have any significant effect on the reaction rate of the reaction that proceeds in any case. A significant acceleration is understood to mean that above 60° C., in particular above 70° C., the presence of the thermolatent catalyst in the coating has a distinct effect on the reaction rate of the reaction that proceeds in any case.

It has been found to be particularly advantageous in the context of the invention when the thermolatent inorganic tin-containing catalyst used in the two-component system comprises cyclic tin compounds of the formula I, II or III or mixtures thereof:

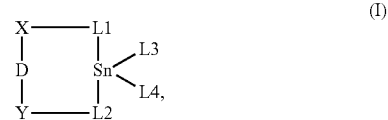

(I)

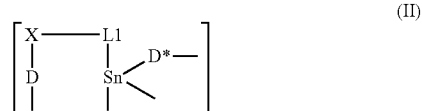

(II)

where n > 1

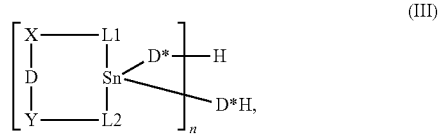

(III)

where n > 1 wherein:

D represents —O—, —S— or —N(R1)—
    wherein R1 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen or the radical

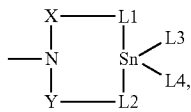

or R1 and L3 together represent —Z-L5—;

D* represents —O— or —S—;

X, Y and Z represent identical or different radicals selected from alkylene radicals having the formulae —C(R2)(R3)—, —C(R2)(R3)—C(R4)(R5)— or —C(R2)(R3)—C(R4)(R5)—C(R6)(R7)— or orthoarylene radicals having the formulae

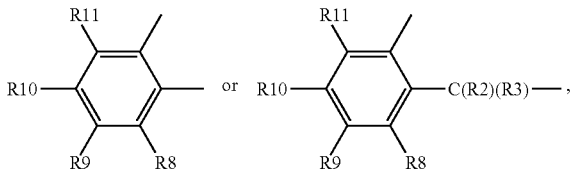

wherein R2 to R11 independently represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen;

L1, L2 and L5 independently represent —O—, —S—, —OC(=O)—, —OC(=S) —SC(=O)—, —SC(=S)—, —OS(=O)$_2$O—, —OS(=O)$_2$— or —N(R12)—,
    wherein R12 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen;

L3 and L4 independently represent —OH, —SH, —OR13, —Hal, —OC(=O)R14, —SR15, —OC(=S)R16, —OS(=O)$_2$OR17, —OS(=O)$_2$R18 or —NR19R20, or L3 and L4 together represent —L1-X-D-Y-L2—,
    wherein R13 to R20 independently represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen.

D is preferably —N(R1)—.

R1 is preferably hydrogen or an alkyl, aralkyl, alkaryl or aryl radical having up to 20 carbon atoms or the radical

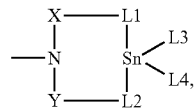

particularly preferably hydrogen or an alkyl, aralkyl, alkaryl or aryl radical having up to 12 carbon atoms or the radical

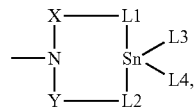

very particularly preferably hydrogen or a methyl, ethyl, propyl, butyl, hexyl or octyl radical, where propyl, butyl, hexyl and octyl are all isomeric propyl, butyl, hexyl and octyl radicals, or Ph—, CH$_3$Ph— or the radical

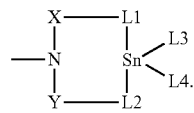

D* is preferably —O—.

X, Y and Z are preferably the —C(R2)(R3), —C(R2)(R3)—C(R4)(R5)— or the ortho-arylene radical

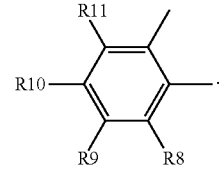

R2 to R7 are preferably hydrogen or alkyl, aralkyl, alkaryl or aryl radicals having up to 20 carbon atoms, particularly preferably hydrogen or alkyl, aralkyl, alkaryl or aryl radicals having up to 8 carbon atoms, very particularly preferably hydrogen or alkyl radicals having up to 8 carbon atoms, yet more preferably hydrogen or methyl.

R8 to R11 are preferably hydrogen or aryl radicals having up to 8 carbon atoms, particularly preferably hydrogen or methyl.

L1, L2 and L5 are preferably —NR12—, —S—, —SC(=S)—, —SC(=O)—, —OC(=S)—, —O—, or —OC(=O)—, particularly preferably —O—, or —OC(=O)—.

R12 is preferably hydrogen or an alkyl, aralkyl, alkaryl or aryl radical having up to 20 carbon atoms, particularly preferably hydrogen or an alkyl, aralkyl, alkaryl or aryl radical having up to 12 carbon atoms, very particularly preferably hydrogen or a methyl, ethyl, propyl, butyl, hexyl or octyl radical, where propyl, butyl, hexyl and octyl represent all isomeric propyl, butyl, hexyl and octyl radicals.

L3 and L4 are preferably —Hal, —OH, —SH, —OR13, —OC(=O)R14, where the R13 and R14 radicals have up to 20 carbon atoms, preferably up to 12 carbon atoms.

L3 and L4 are particularly preferably Cl—, MeO—, EtO—, PrO—, BuO—, HexO—, OctO—, PhO—, formate, acetate, propanoate, butanoate, pentanoate, hexanoate, octanoate, laurate, lactate or benzoate, where Pr, Bu, Hex and Oct are all isomeric propyl, butyl, hexyl and octyl radicals, yet more preferably Cl—, MeO—, EtO—, PrO—, BuO—, HexO—, OctO—, PhO—, hexanoate, laurate or benzoate, where Pr, Bu, Hex and Oct represent all isomeric propyl, butyl, hexyl and octyl radicals.

R15 to R20 are preferably hydrogen or alkyl, aralkyl, alkaryl or aryl radicals having up to 20 carbon atoms, particularly preferably hydrogen or alkyl, aralkyl, alkaryl or aryl radicals having up to 12 carbon atoms, very particularly preferably hydrogen, methyl, ethyl, propyl, butyl, hexyl or octyl radicals, where propyl, butyl, hexyl and octyl represent all isomeric propyl, butyl, hexyl and octyl radicals.

The units L1-X, L2-Y and L5-Z preferably represent —CH$_2$CH$_2$O—, —CH$_2$CH(Me)O—, —CH(Me)CH$_2$O—, —CH$_2$C(Me)$_2$O—, —C(Me)$_2$CH$_2$O— or —CH$_2$C(=O)O—

The unit L1-X-D-Y-L2 preferably represents: HN[CH$_2$CH$_2$O—]$_2$, HN[CH$_2$CH(Me)O—]$_2$, HN[CH$_2$CH(Me)O—][CH(Me)CH$_2$O—], HN[CH$_2$C(Me)$_2$O—]$_2$, HN[CH$_2$C(Me)$_2$O—][C(Me)$_2$CH$_2$O—], HN[CH$_2$C(=O)O—]$_2$, MeN[CH$_2$CH$_2$O—]$_2$, MeN[CH$_2$CH(Me)O—]$_2$, MeN[CH$_2$CH(Me)O—][CH(Me)CH$_2$O—], MeN[CH$_2$C(Me)$_2$O]$_2$, MeN[CH$_2$C(Me)$_2$O—][C(Me)$_2$CH$_2$O—], MeN[CH$_2$C(=O)O—]$_2$, EtN[CH$_2$CH$_2$O—]$_2$, EtN[CH$_2$CH(Me)O—]$_2$, EtN[CH$_2$CH(Me)O—][CH(Me)CH$_2$O—], EtN[CH$_2$C(Me)$_2$O]$_2$, EtN[CH$_2$C(Me)$_2$O—][C(Me)$_2$CH$_2$O-], EtN[CH$_2$C(=O)O-]$_2$, PrN[CH$_2$CH$_2$O—]$_2$, PrN[CH$_2$CH(Me)O—]$_2$, PrN[CH$_2$CH(Me)O—][CH(Me)CH$_2$O—], PrN[CH$_2$C(Me)$_2$O—]$_2$, PrN[CH$_2$C(Me)$_2$O—][C(Me)$_2$CH$_2$O—], PrN[CH$_2$C(=O)O—]$_2$, BuN[CH$_2$CH$_2$O—]$_2$, BuN[CH$_2$CH(Me)O—]$_2$, BuN[CH$_2$CH(Me)O—][CH(Me)CH$_2$O—], BuN[CH$_2$C(Me)$_2$O—]$_2$, BuN[CH$_2$C(Me)$_2$O—][C(Me)$_2$CH$_2$O—], BuN[CH$_2$C(=O)O]$_2$, HexN[CH$_2$CH$_2$O—]$_2$, HexN[CH$_2$CH(Me)O—]$_2$, HexN[CH$_2$CH(Me)O—][CH(Me)CH$_2$O—], HexN[CH$_2$C(Me)$_2$O—]$_2$, HexN[CH$_2$C(Me)$_2$O—][C(Me)$_2$CH$_2$O—], HexN[CH$_2$C(=O)O—]$_2$, OctN[CH$_2$CH$_2$O—]$_2$, OctN[CH$_2$CH(Me)O—]$_2$, OctN[CH$_2$CH(Me)O—][CH(Me)CH$_2$O—], OctN[CH$_2$C(Me)$_2$O—]$_2$, OctN[CH$_2$C(Me)$_2$O—][C(Me)$_2$CH$_2$O—], OctN[CH$_2$C(=O)O—]$_2$, wherein Pr, Bu, Hex and Oct may represent any isomeric propyl, butyl and octyl radicals, PhN[CH$_2$CH$_2$O—]$_2$, PhN[CH$_2$CH(Me)OP—]$_2$, PhN[CH$_2$CH(Me)O—][CH(Me)CH$_2$O—], PhN[CH$_2$C(Me)$_2$O—]$_2$, PhN[CH$_2$C(Me)$_2$o—][C(Me)$_2$CH$_2$O—], PhN[CH$_2$C(=O)O—]$_2$,

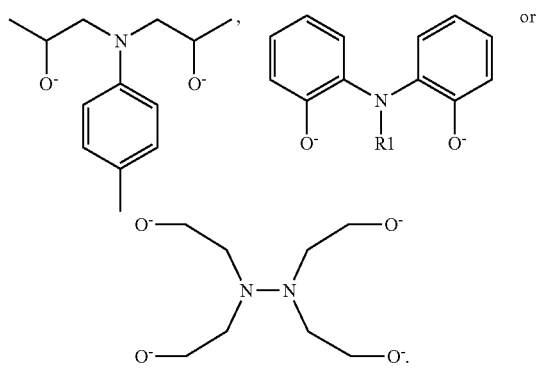

Processes for producing the thermolatent catalysts suitable according to the invention are described for example in: EP 2 900 716 A1, EP 2 900 717 A1, EP 2 772 496 A1, EP 14182806, J. Organomet. Chem. 2009 694 3184-3189, Chem. Heterocycl. Comp. 2007 43 813-834, Indian J. Chem. 1967 5 643-645 and in the literature referenced therein, the disclosure content of which is hereby incorporated by reference in its entirety.

As is known to the person skilled in the art, tin compounds have a propensity to oligomerize, and so there are often polynuclear tin compounds or mixtures of mono- and polynuclear tin compounds. In the polynuclear tin compounds, the tin atoms are preferably connected to one another via oxygen atoms ('oxygen bridges'). Typical oligomeric complexes (polynuclear tin compounds) form, for example, through condensation of the tin atoms via oxygen or sulfur, for example

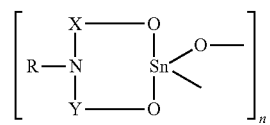

where n>1 (cf. formula II). Cyclic oligomers are frequently encountered in the case of low degrees of oligomerization, linear oligomers with OH or SH end groups in the case of high degrees of oligomerization (cf. formula III).

In one embodiment of the invention, the thermolatent catalyst is selected from the group of mono- or polynuclear tin compounds of the type:

1,1-di-"R"-5-"organyl"-5-aza-2,8-dioxa-1-stanna-cyclooctane, 1,1-di-"R"-5-(N-"organyl")aza-3,7-di-"organyl"-2,8-dioxa-1-stanna-cyclooctane, 1,1-Di-"R"-5-(N-"organyl")aza-3,3,7,7-tetra-"organyl"-2,8-dioxa-1-stanna-cyclooctane, 4,12-di-"organyl"-1,7,9,15-tetraoxa-4,12-diaza-8-stannaspiro[7.7]pentadecane, 4,12-di-"organyl"-2,6,10,14-tetra-"organyl"-1,7,9,15-tetraoxa-4,12-diaza-8-stannaspiro[7.7]pentadecane, 4,12-di-"organyl"-2,2,6,6,10,10,14,14-octa-"organyl"-1,7,9,15-tetraoxa-4,12-diaza-8-stannaspiro[7.7]pentadecane, wherein "R" is D*, L3 or L4, as defined above, and "organyl" is R1, as defined above.

In a preferred embodiment of the invention, the thermolatent catalyst is selected from:

4,12-di-n-butyl-1,7,9,15-tetraoxa-4,12-diaza-8-stannaspiro[7.7]pentadecane, 4,12-di-n-butyl-2,6,10,14-tetramethyl-1,7,9,15-tetraoxa-4,12-diaza-8-stannaspiro[7.7]pentadecane, 2,4,6,10,12,14-hexamethyl-1,7,9,15-tetraoxa-4,12-diaza-8-stannaspiro[7.7]pentadecane, 4,12-di-n-octyl-2,6,10,14-tetramethyl-1,7,9,15-tetraoxa-4,12-diaza-8-stannaspiro[7.7]pentadecane, 4,12-di-n-octyl-1,7,9,15-tetraoxa-4,12-diaza-8-stannaspiro[7.7]pentadecane, 4,12-dimethyl-1,7,9,15-tetraoxa-4,12-diaza-8-stannaspiro[7.7]pentadecane, 1,1-dichloro-5-methyl-5-aza-2,8-dioxa-1-stannacyclooctane or mixtures thereof.

The thermolatent inorganic tin-containing catalysts may be combined with further catalysts/activators known from the prior art; for example titanium, zirconium, bismuth, tin(II) and/or iron catalysts, as described, for example, in WO 2005/058996. It is also possible to add amines or amidines. In addition, in the polyisocyanate polyaddition reaction, it is also possible to add acidic compounds, for example 2-ethylhexanoic acid, or alcohols to control the reaction.

The amount of thermolatent inorganic tin-containing catalyst to be used according to the invention may be varied within a wide range and is preferably ≥50 to ≤5000 ppmw, preferably ≥100 to ≤3000 ppmw, particularly preferably ≥300 to ≤2500 ppmw and very particularly preferably ≥500 to ≤1500 ppmw of tin based on the total amount of polyisocyanate in the component B).

Both the component A) and the component B) may further comprise customary auxiliaries and additions in effective amounts. Effective amounts for solvents are preferably up to 150% by weight, particularly preferably up to 100% by weight and especially up to 70% by weight, based in each case on the nonvolatile constituents of the two-component system according to the invention. Effective amounts of other additives are preferably up to 25% by weight, particularly preferably up to 10% by weight and especially up to 5% by weight, based in each case on the nonvolatile constituents of the two-component system according to the invention.

Examples of suitable auxiliaries and additions are especially light stabilizers such as UV absorbers and sterically hindered amines (HALS), and also stabilizers, fillers and antisettling agents, defoaming, anticratering and/or wetting agents, leveling agents, film-forming auxiliaries, reactive diluents, solvents, substances for rheology control, slip additives and/or components which prevent soiling and/or improve the cleanability of the cured coatings, and also matting agents.

The use of light stabilizers, especially of UV absorbers, for example substituted benzotriazoles, S-phenyltriazines or oxalanilides, and of sterically hindered amines, especially having 2,2,6,6-tetramethylpiperidyl structures—referred to as HALS—is described by way of example in A. Valet, Lichtschutzmittel für Lacke, Vincentz Verlag, Hanover, 1996.

Stabilizers such as, for example, free-radical scavengers and other polymerization inhibitors such as sterically hindered phenols, stabilize paint components during storage and are intended to prevent discoloration during curing. Also contemplated for component B) are acidic stabilizers such as alkyl-substituted phosphoric partial esters.

The two-component system according to the invention may further contain pigments, dyes and/or fillers. The pigments including metallic or other effect pigments, dyes and/or fillers used therefor are known to those skilled in the art.

Preferred fillers are those compounds that have no adverse effect on the appearance of the coating. Examples are nanoparticles based on silicon dioxide, aluminum oxide or zirconium oxide; reference is also made additionally to the Römpp Lexicon "Lacke and Druckfarben" [Coatings and Printing Inks] Georg Thieme Verlag, Stuttgart, 1998, pages 250 to 252.

If fillers, matting agents or pigments are present in the two-component system according to the invention, the addition of antisettling agents may be advisable to prevent separation of the constituents in the course of storage.

Wetting and leveling agents improve surface wetting and/or the leveling of coatings. Examples are fluoro surfactants, silicone surfactants and specific polyacrylates. Rheology control additives are important in order to control the properties of the two-component system on application and in the leveling phase on the substrate and are known, for example, from patent specifications WO 94/22968, EP-A-0 276 501, EP-A-0 249 201 or WO 97/12945; crosslinked polymeric microparticles are disclosed, for example, in EP-A-0 008 127; inorganic sheet silicates such as aluminum-magnesium silicates, sodium-magnesium and sodium-magnesium-fluorine-lithium sheet silicates of the montmorillonite type; silicas such as Aerosil®; or synthetic polymers having ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and derivatives thereof, or hydrophobically modified ethoxylated urethanes or polyacrylates.

The two-component system according to the invention may be used in a solvent-free state but preferably contains at least one solvent in the component A) and/or component B). In the event that solvent used in the component A) contains water as a consequence of production, the water content may be determined by the abovementioned Karl Fischer titration in order that the water content of the component A) may be adjusted appropriately.

Suitable solvents should be used so as to be matched to the employed two-component system and to the application process in the manner known to those skilled in the art. Solvents are intended to dissolve the components used and promote the mixing thereof, and to avoid incompatibilities. In addition, during the application and the curing, they should leave the coating in a manner matched to the proceeding crosslinking reaction so as to afford a solvent-free coating with the best possible appearance and without defects such as popping or pinholes. Contemplated solvents include in particular those used in two-component technology. Examples are ketones such as acetone, methyl ethyl ketone or hexanone, esters such as ethyl acetate, butyl acetate, methoxypropyl acetate, substituted glycols and other ethers, aromatics such as xylene or solvent naphtha, for example from Exxon-Chemie, and mixtures of the solvents mentioned.

The two-component system according to the invention may very readily be used for coating a substrate.

The present invention therefore further provides a process for producing a coating on a substrate, comprising the steps of:
a1) providing a substrate;
b1) applying at least one two-component system according to the invention;
c1) curing the coating by heating.

The two-component system may moreover also absorb the water via the atmospheric humidity of the application atmosphere during application of the two-component system onto a substrate. It is preferable when the relative atmospheric humidity of the application atmosphere is ≥30% to ≤80%, preferably ≥35% to ≤75% and particularly preferably ≥45% to ≤65%.

Thus, the present invention likewise provides a process for producing a coating on a substrate, comprising the steps of:
a2) providing a substrate;
b2) applying at least one two-component system containing a component A) comprising at least one NCO-reactive compound and a component B) comprising at least one polyisocyanate, wherein component A) and/or component B) contain at least one thermolatent inorganic tin-containing catalyst;
c2) curing the coating by heating,
wherein the two-component system during application in step b2) absorbs from the application atmosphere ≥400 to ≤9500 ppmw of water based on the total weight of the component A).

It is preferable here when the two-component system during application in step b2) absorbs ≥501 to ≤6500 ppmw, preferably ≥700 to ≤5000 ppmw, particularly preferably ≥1001 to ≤4000 ppmw and very particularly preferably ≥1400 to ≤2400 ppmw of water based on the total weight of the component A).

In this way a two component system which for example does not contain enough water as a consequence of production and/or is used in the process according to the invention without addition of water into the component A) can absorb water contents of ≥400 to ≤9500 ppmw, preferably ≥501 to ≤6500 ppmw, particularly preferably ≥700 to ≤5000 ppmw, very particularly preferably ≥1001 to ≤4000 ppmw and, in particular, very particularly preferably ≥1400 to ≤2400 ppmw of water based on the total weight of the component A) during application onto the substrate.

Hereinbelow, step a) stands for step a1) and/or step a2), step b) stands for step b1) and/or step b2), step c) stands for step c1) and/or step c2).

For use in step a) of the processes according to the invention recited above, the substrates may be uncoated or coated. As a coating, primers, fillers and/or basecoats, for example, may already have been applied to the substrate before it is used in the process according to the invention. Examples of primers are especially cathodic dip coats as used in OEM automobile finishing, solventborne or aqueous primers for plastics, especially for plastics having low surface tension, such as PP or PP-EPDM. Suitable basecoats are known to those skilled in the art for example from A. Goldschmidt, H. Streitberger, "BASF Handbuch Lackiertechnik", Vincentz-Verlag, Hannover, D, 2002. Such products are obtainable for example from Karl Wörwag Lack- and Farbenfabrik GmbH & Co. KG, Stuttgart, DE under the trade name "COATiQ® WÖRWAG PREMIUM BASECOATS", from BASF Coatings GmbH, Munster, DE under the trade name "xColor" and from Hemmelrath Lackfabrik GmbH, Klingenberg, DE under the trade name "Primum Base".

Suitable substrates are, for example, substrates comprising one or more materials, especially including so-called composite materials. A substrate formed from at least two materials is referred to in accordance with the invention as composite material. Suitable materials are, for example, wood, metal, plastic, paper, leather, textiles, felt, glass, woodbase materials, cork, inorganically bound substrates such as wood and fiber cement boards, electronic assemblies or mineral substrates. Suitable types of composite material are, for example, particle composite materials, also referred to as dispersion materials, fiber composite materials, laminar composite materials, also referred to as laminates, penetration composite materials and structural composite materials.

Suitable metals are, for example, steel, aluminum, magnesium and alloys of metals as used in the applications of so-called wire coating, coil coating, can coating or container coating, and the like.

In the context of the invention, the term plastic also comprehends fiber-reinforced plastics, for example glass- or carbon fiber-reinforced plastics, and plastics blends composed of two or more plastics.

Examples of plastics suitable in accordance with the invention are ABS, AMMA, ASA, CA, CAB, EP, UF, CF, MF, MPF, PF, PAN, PA, PE, HDPE, LDPE, LLDPE, UHM-WPE, PET, PMMA, PP, PS, SB, PUR, PVC, RF, SAN, PBT, PPE, POM, PUR-RIM, SMC, BMC, PP-EPDM and UP (abbreviations according to DIN 7728T1). These may also be in the form of films or in the form of glass fiber- or carbon fiber-reinforced plastics.

In a preferred embodiment of the process according to the invention the substrate has a surface made completely or partially of plastic and/or metal. Particularly preferably, the substrate consists at least partly of a composite material, especially of a composite material comprising plastic and/or metal.

In a further embodiment of the process of the invention, the substrate comprises metal; more particularly, the substrate may consist of metal to an extent of 80% by weight, 70% by weight, 60% by weight, 50% by weight, 25% by weight, 10% by weight, 5% by weight, 1% by weight.

In one embodiment of the invention, the substrate to be provided in step a) is a chassis or parts thereof which comprise(s) one or more of the aforementioned materials. Preferably, the chassis or parts thereof comprise(s) one or more of the materials selected from metal, plastic or mixtures thereof.

In a further embodiment the substrate to be provided in step a) is a plastic part from the "consumer electronics" sector.

The application of the two-component system in step b) of the process according to the invention may be effected from solution. Suitable methods of application are, for example, printing, painting, rolling, casting, dipping, fluidized bed methods and/or spraying, for example compressed air spraying, airless spraying, high rotation, electrostatic spray application (ESTA), optionally combined with hot spray application, for example hot-air spraying. Particularly preferred here is application by spraying such as, for example, compressed air spraying, airless spraying, high-speed rotation, electrostatic spray application (ESTA), optionally in conjunction with hot spray applications such as hot air spraying for example.

The two-component system to be applied in step b) may be applied either after the mixing of the components A) and B) or only directly upon application. In the first case, the mixed two-component system has a limited shelf life, the so-called pot life, since the crosslinking reaction already proceeds slowly after the mixing. In the second case the advantageous effect of the extended pot life is apparent for example in an improved lacquer appearance since the two-component system according to the invention can form a uniform film on the substrate while, simultaneously, the development of hardness surprisingly remains at a high level since the catalytic activity of the thermolatent inorganic tin-containing catalyst is not impaired.

It has been found to be particularly appropriate in practice for the process according to the invention when the curing in step c) is effected at a substrate temperature of below 120° C., preferably below 110° C., particularly preferably below 100° C., especially below 90° C.

The curing in step c) of the process according to the invention is advantageously essentially complete within less than 45 minutes. Preferably, the curing in step e) is essentially complete within less than 40 minutes, particularly preferably less than 35 minutes, very particularly preferably within less than 30 minutes.

"Essentially complete" as used here means that the residual isocyanate content after the curing in step c) is less than 20%, preferably less than 15%, especially preferably less than 10%, particularly preferably less than 5%, very particularly preferably less than 3%, based on the isocyanate content of the polyisocyanate in step b). The percentage of isocyanate groups still present can be determined by comparison of the content of isocyanate groups in % by weight in step b) with the content of isocyanate groups in % by weight after the curing in step c), for example by comparison of the intensity of the isocyanate band at about 2270 cm$^{-1}$ by means of IR spectroscopy.

In a particular embodiment of the process of the invention, step c) may be followed by a further step d1) and/or a further step d2) in which the coating is detached from the substrate again to produce a film.

The process of the invention therefore enables the common painting of pure metal substrates and thermoplastics or composite materials. A further advantage of the process of the invention is that the painting process is energy-efficient and inexpensive by virtue of the much lower temperatures used compared to the standard processes.

The present invention further provides the component A) for use in the two-component system according to the invention.

The present invention further provides the component B) for use in the two-component system according to the invention.

The invention further provides a coating produced or producible by the process according to the invention.

The invention further provides substrates coated with the coating according to the invention.

In a preferred embodiment of the invention the substrate coated with the coating of the invention may be a chassis, especially of a vehicle, or parts thereof. The vehicle may be formed from one or more materials. Suitable materials are, for example, metal, plastic or mixtures thereof. The vehicle may be any vehicle known to those skilled in the art. For example, the vehicle may be a motor vehicle, heavy goods vehicle, motorcycle, moped, bicycle or the like. Preferably, the vehicle is a motor vehicle and/or heavy goods vehicle, particularly preferably a motor vehicle.

In a further preferred embodiment of the invention, the substrate coated with the coating according to the invention is a chassis or parts thereof which comprise(s) one or more of the materials selected from metal, plastic or mixtures thereof.

In a further preferred embodiment the substrate to be provided in step a) is a plastic part from the "consumer electronics" sector.

The invention is elucidated in detail hereinafter by examples.

EXAMPLES 4 mm DIN Cup Efflux Time:

The efflux time was determined according to DIN 53211 (DIN 53211 was withdrawn in October 1996) using a 4 mm DIN cup from BYK Gardner, the determination being performed at room temperature without exact temperature control since only comparative values and not absolute values are concerned here.

König Pendulum Damping:

Pendulum damping was determined in a climate controlled room at 23° C. and 50% relative humidity using a pendulum damping tester from BYK Gardner according to the standard ISO 1522.

Karl Fischer Water Determination:

The water content was determined by Karl Fischer titration as a volumetric method according to DIN 53715 (DIN 53715 was based on DIN 51777 part 1 (1973 edition). The water content was measured with a Methrom Titrando 841 automatic titrator. The measurement range of the water content was 0.01%–<99% by weight.

Substances Used:

The raw materials were used without further purification or pretreatment unless otherwise stated. All % and ratio figures are based on weight.

Setalux D A 665 BA/X: OH-containing acrylate polyol (Nuplex, NL), Byk 355: surface additive based on a polyacrylate for flow improvement (Byk Chemie GmbH, DE), DBTL: dibutyltin dilaurate, catalyst, CAS 77-58-7 (Aldrich, DE), MPA: 1-methoxy-2-propyl acetate, CAS 108-65-6, solvent (BASF SE, DE), xylene: isomer mixture, CAS 1330-20-7, solvent, (Aldrich, DE), Desmodur N 3390 BA, crosslinker, HDI trimer (Covestro, DE), butyl acetate: acetic acid n-butyl ester, CAS 123-86-4, solvent (BASF SE, DE).

Pot Life Experiments Using 4 mm DIN Cup

Clearcoat Formulation

To demonstrate the effect of the described two-component systems on pot life, solvent-containing clearcoats based on an OH-containing acrylate polyol were produced. To this end, components A and B were weighed in consecutively and mixed. In the context of the invention, the pot life is defined as the time within which paint has doubled in viscosity (determined indirectly by doubling of the efflux time in the DIN cup, 4 mm).

TABLE 1

Clearcoat formulations produced

| | | Clearcoat formulation | | | | |
|---|---|---|---|---|---|---|
| | | 1 (comparative) | 2 | 3 | 4 | 5 |
| A.) | Setalux D A 665 BA/X, as supplied [g] | 47.37 | 47.37 | 47.37 | 47.37 | 47.37 |
| | Deionized water [g] | — | 0.03 | 0.05 | 0.07 | 0.09 |
| | BYK 355, as supplied [g] | 0.20 | 0.20 | 0.20 | 0.20 | 0.20 |
| | Butyl acetate/xylene/methoxypropyl acetate (1:1:1) [g] | 32.76 | 32.73 | 32.71 | 32.69 | 32.67 |
| B.) | Desmodur N 3390 BA, as supplied [g] | 19.13 | 19.13 | 19.13 | 19.13 | 19.13 |
| | 4,12-Di-n-butyl-2,6,10,14-tetramethyl-1,7,9,15-tetraoxa-4,12-diaza-8-stannaspiro[7.7]pentadecane, as supplied, 10% in butyl acetate [g] | 0.54 | 0.54 | 0.54 | 0.54 | 0.54 |
| | DBTL, 10% in butyl acetate [g] | — | — | — | — | — |
| | Total weight | 100.00 | 100.00 | 100.00 | 100.00 | 100.00 |
| | Solids content at spray viscosity | 48.26% | 48.26% | 48.26% | 48.26% | 48.26% |
| | DIN cup efflux time, 4 mm | 20 sec. | 20 sec. | 20 sec. | 20 sec. | 20 sec. |
| | Karl Fischer water content | 350 ppm | 600 ppm | 800 ppm | 1100 ppm | 1400 ppm |

TABLE 1-continued

Clearcoat formulations produced

| | | Clearcoat formulation | | | | |
|---|---|---|---|---|---|---|
| | | 6 | 7 | 8 | 9 (comparison) | 10 (comparative) |
| A.) | Setalux D A 665 BA/X, as supplied [g] | 47.37 | 47.37 | 47.37 | 47.37 | 47.37 |
| | Deionized water [g] | 0.20 | 0.24 | 0.38 | — | 0.09 |
| | BYK 355, as supplied [g] | 0.20 | 0.20 | 0.20 | 0.20 | 0.20 |
| | Butyl acetate/xylene/methoxypropyl acetate (1:1:1) [g] | 32.56 | 32.52 | 32.38 | 32.61 | 32.52 |
| B.) | Desmodur N 3390 BA, as supplied [g] | 19.13 | 19.13 | 19.13 | 19.13 | 19.13 |
| | 4,12-Di-n-butyl-2,6,10,14-tetramethyl-1,7,9,15-tetraoxa-4,12-diaza-8-stannaspiro[7.7]pentadecane, as supplied, 10% in butyl acetate [g] | 0.54 | 0.54 | 0.54 | — | — |
| | DBTL, 10% in butyl acetate [g] | — | — | — | 0.69 | 0.69 |
| | Total weight | 100.00 | 100.00 | 100.00 | 100.00 | 100.00 |
| | Solids content at spray viscosity | 48.26% | 48.26% | 48.26% | 48.26% | 48.26% |
| | DIN cup efflux time, 4 mm | 20 sec. | 20 sec. | 20 sec. | 20 sec. | 20 sec. |
| | Karl Fischer water content | 2700 ppm | 3100 ppm | 5000 ppm | 350 ppm | 1400 ppm |

DBTL = dibutyltin dilaurate

Pot Life Determination

To achieve crosslinking of the two-component system the mixtures A and B were subsequently homogeneously mixed with one another by stirring with a laboratory stirrer (60 sec. at 1000 rpm.) The mixed system was then left to rest for 60 sec in order then to determine the initial efflux time using the 4 mm DIN cup at room temperature.

The efflux time was redetermined every 30 minutes to track the increase in viscosity by means of the increasing efflux time.

TABLE 2

4 mm DIN cup efflux time

| | Clearcoat formulation | | | | |
|---|---|---|---|---|---|
| | 1 (comparative) (350 ppm water/latcat) | 2 (600 ppm water/latcat) | 3 (800 ppm water/latcat) | 4 (1100 ppm water/latcat) | 5 (1400 ppm water/latcat) |
| initial efflux time | 20 sec. | 20 sec. | 20 sec. | 20 sec. | 20 sec. |
| after 30 min. | 53 sec. | 30 sec. | 26 sec. | 24 sec. | 23 sec. |
| after 60 min. | nm | 43 sec. | 30 sec. | 27 sec. | 24 sec. |
| after 90 min. | nm | 64 sec. | 35 sec. | 29 sec. | 26 sec. |
| after 120 min. | nm | 94 sec. | 42 sec. | 32 sec. | 27 sec. |
| after 150 min. | nm | nm | 52 sec. | 34 sec. | 29 sec. |
| after 180 min. | nm | nm | 66 sec. | 38 sec. | 30 sec. |
| after 240 min. | nm | nm | 94 sec. | 52 sec. | 36 sec. |
| Pot life | <30 min. | <60 min. | <120 min. | <240 min. | >240 min. |

| | Clearcoat formulation | | | | |
|---|---|---|---|---|---|
| | 6 (2700 ppm water/latcat) | 7 (3100 ppm water/latcat) | 8 (5000 ppm water/latcat) | 9 (comparative) (350 ppm water/DBTL) | 10 (comparative) (1400 ppm water/DBTL) |
| initial efflux time | 20 sec. | 20 sec. | 20 sec. | 20 sec. | 20 sec. |
| after 30 min. | 23 sec. | 21 sec. | 21 sec. | 31 sec. | 31 sec. |
| after 60 min. | 25 sec. | 22 sec. | 22 sec. | nm | nm |
| after 90 min. | 26 sec. | 23 sec. | 22 sec. | nm | nm |
| after 120 min. | 27 sec. | 24 sec. | 23 sec. | nm | nm |
| after 150 min. | 28 sec. | 24 sec. | 23 sec. | nm | nm |
| after 180 min. | 32 sec. | 26 sec. | 24 sec. | nm | nm |
| after 240 min. | 34 sec. | 27 sec. | 26 sec. | nm | nm |
| Pot life | >240 min. | >240 min. | >240 min. | <30 min. | <30 min. | latcat = 4,12-di-n-butyl-2,6,10,14-tetramethyl-1,7,9,15-tetraoxa-4,12-diaza-8-stannaspiro[7.7]pentadecane;
DBTL = dibutyltin dilaurate The results show that in the case of DBTL as the catalyst water content (examples 9 and 10) is not found to have any effect on pot life. By contrast the thermolatent catalyst shows differences in the pot life depending on the content of water in the mixed system. At 350 ppm of water (comparative example 1) in the system the pot life is markedly shorter (similarly to comparative examples 9 and 10) than in the inventive examples 2 to 8.

Hardness determination by König Pendulum Damping

For hardness determination the clearcoat formulations produced for the pot life determination were in each case applied to three glass sheets using a 120 μm film casting frame after crosslinking and subsequent resting time. After a flash-off time of 15 minutes at room temperature, in each case one glass plate was dried in a recirculating air drying cabinet at 60° C. for 30 min and a further one was dried at 80° C. for 30 min before being placed with the third glass plate in to a climate-controlled room at 23° C. and 50% relative atmospheric humidity. In the case of the glass plates dried in the recirculating air drying cabinet the König pendulum damping was determined according to ISO 1522 after 3 hours in the climate controlled room. The König pendulum damping of all three glass plates was redetermined after 24 hours in the climate-controlled room.

It was demonstrated that the development of hardness and the accompanying physical properties are not disadvantageously altered with the addition of moisture into the two-component system. The catalytic activity of the thermolatent catalyst is also retained.

According to the invention by addition of moisture in combination with the thermolatent catalyst a reproducibly extended pot life for two-component systems can be demonstrated without adversely affecting the catalytic activity of the thermolatent catalyst for curing the applied two-component system by increasing the temperature.

The invention claimed is:

1. A two-component coatings system containing a component A) comprising at least one NCO-reactive compound and a component B) comprising at least one polyisocyanate, characterized in that the component A) contains ≥400 to ≤9500 ppmw of water based on the total weight of the component A) and the component A) and/or the component B) contains at least one thermolatent inorganic tin-containing catalyst.

2. The two-component coatings system as claimed in claim 1, characterized in that the component A) contains ≥501 to ≤6500 ppmw of water based on the total weight of the component A).

TABLE 3

König pendulum damping:

| | Clearcoat formulation | | | | |
|---|---|---|---|---|---|
| | 1 (comparative) (350 ppm water/latcat) | 2 (600 ppm water/latcat) | 3 (800 ppm water/latcat) | 4 (1100 ppm water/latcat) | 5 (1400 ppm water/latcat) |
| Drying: Climate-controlled room after 24 hours in climate-controlled room | 64 sec. | 67 sec. | 61 sec. | 70 sec. | 66 sec. |
| Drying: 30 min. at 60° C. after 3 hours in climate-controlled room | 55 sec. | 80 sec. | 67 sec. | 70 sec. | 66 sec. |
| Drying: 30 min. at 60° C. after 24 hours in climate-controlled room | 128 sec. | 135 sec. | 126 sec. | 128 sec. | 131 sec. |
| Drying: 30 min. at 80° C. after 3 hours in climate-controlled room | 172 sec. | 186 sec. | 184 sec. | 184 sec. | 179 sec. |
| Drying: 30 min. at 80° C. after 24 hours in climate-controlled room | 191 sec. | 194 sec. | 194 sec. | 191 sec. | 190 sec. |

| | Clearcoat formulation | | | | |
|---|---|---|---|---|---|
| | 6 (2700 ppm water/latcat) | 7 (3100 ppm water/latcat) | 8 (5000 ppm water/latcat) | 9 (comparative) (350 ppm water/DBTL) | 10 (comparative) (1400 ppm water/DBTL) |
| Drying: Climate-controlled room after 24 hours in climate-controlled room | 86 sec. | 100 sec. | 70 sec. | 61 sec. | 64 sec. |
| Drying: 30 min. at 60° C. after 3 hours in climate-controlled room | 36 sec. | 52 sec. | 29 sec. | 67 sec. | 66 sec. |
| Drying: 30 min. at 60° C. after 24 hours in climate-controlled room | 128 sec. | 126 sec. | 118 sec. | 126 sec. | 128 sec. |
| Drying: 30 min. at 80° C. after 3 hours in climate-controlled room | 148 sec. | 166 sec. | 133 sec. | 184 sec. | 175 sec. |
| Drying: 30 min. at 80° C. after 24 hours in climate-controlled room | 182 sec. | 187 sec. | 172 sec. | 194 sec. | 190 sec. |

3. The two-component coatings system as claimed in claim 1, characterized in that the NCO-reactive compound is a polyhydroxyl compound.

4. The two-component coatings system as claimed in claim 1, characterized in that the polyisocyanate is an aliphatic or cycloaliphatic polyisocyanate.

5. The two-component coatings system as claimed in claim 1, characterized in that the polyisocyanate is a derivative of hexamethylene diisocyanate or of pentamethylene diisocyanate.

6. The two-component coatings system as claimed in claim 1, characterized in that the thermolatent inorganic tin-containing catalyst comprises cyclic tin compounds of formula I, II or III or mixtures thereof:

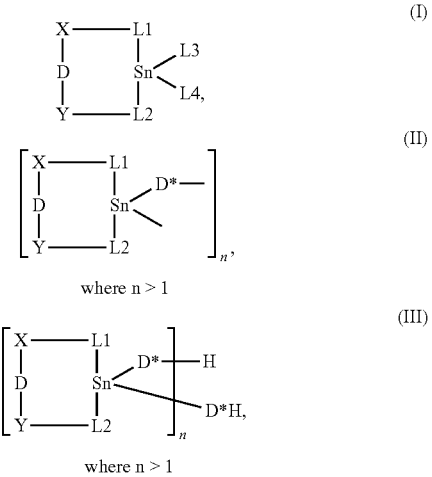

where:
D represents —O—, —S— or —N(R1)—
wherein R1 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen or the radical

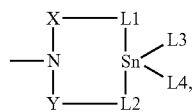

or R1 and L3 together represent —Z—L5—;
D* represents —O— or —S—;
X, Y and Z represent identical or different radicals selected from alkylene radicals having the formulae —C(R2)(R3)—, —C(R2)(R3)—C(R4)(R5)— or —C(R2)(R3)—C(R4)(R5)—C(R6)(R7)— or ortho-arylene radicals having the formulae

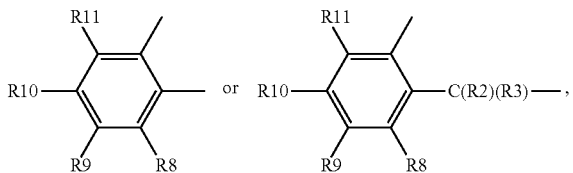

wherein R2 to R11 independently represent saturated or unsaturated, linear or branched, aliphatic or cycloaliphatic or optionally substituted aromatic or araliphatic radicals which have up to 20 carbon atoms and may optionally contain heteroatoms from selected from the group consisting of oxygen, sulfur, nitrogen, or are hydrogen;

L1, L2 and L5 independently represent —O—, —S—, —OC(=O)—, —OC(=S) —SC(=O)—, —SC(=S)—, —OS(=O)$_2$O—, —OS(=O)$_2$— or —N(R12)—,
wherein R12 represents a saturated or unsaturated, linear or branched, aliphatic or cycloaliphatic radical or an optionally substituted aromatic or araliphatic radical which has up to 20 carbon atoms and may optionally contain heteroatoms selected from the group consisting of oxygen, sulfur, nitrogen, or is hydrogen;

L3 and L4 independently represent —OH, —SH, —OR13, —Hal, —OC(=O)R14, —SR15, —OC(=S)R16, —OS(=O)$_2$OR17, —OS(=O)$_2$R18 or —NR19R20, or L3 and L4 together represent —L1—X—D—Y—L2—,
wherein R13 to R20 independently represent saturated or unsaturated, linear or branched, aliphatic or cycloaliphatic or optionally substituted aromatic or araliphatic radicals which have up to 20 carbon atoms and may optionally contain heteroatoms selected from the group consisting of oxygen, sulfur, nitrogen, or are hydrogen.

7. A process for producing a coating on a substrate, comprising the steps of:
 a1) providing a substrate;
 b1) applying at least one two-component coatings system according to claim 1; and
 c1) curing the coating by heating.

8. A process for producing a coating on a substrate, comprising the steps of:
 a2) providing a substrate;
 b2) applying at least one two-component coatings system containing a component A) comprising at least one NCO-reactive compound and a component B) comprising at least one polyisocyanate, wherein component A) and/or component B) contain at least one thermolatent inorganic tin-containing catalyst;
 c2) curing the coating by heating,
 characterized in that the two-component coatings system during application in step b2) absorbs from the application atmosphere ≥400 to ≤9500 ppmw of water based on the total weight of the component A).

9. The process as claimed in claim 8, characterized in that the two-component coatings system during application in step b2) absorbs ≥501 to ≤6500 ppmw of water based on the total weight of the component A).

10. The process as claimed in claim 7, characterized in that the substrate has a surface made completely or partially of plastic and/or metal.

11. A component A) for use in a two-component coatings system as claimed in claim 1.

12. A component B) for use in a two-component coatings system as claimed in claim 1.

13. A coating produced or producible by the process according to claim 7.

14. A substrate coated with a coating as claimed in claim 13, wherein the substrate may be a chassis or parts thereof.

15. The substrate as claimed in claim 14, characterized in that the chassis or parts thereof comprise(s) one or more of the materials selected from metal, plastic or mixtures thereof.

16. The two-component coatings system as claimed in claim 1, characterized in that the component A) contains ≥700 to ≤5000 ppmw of water based on the total weight of the component A).

17. The two-component coatings system as claimed in claim 1, characterized in that the component A) contains ≥1001 to ≤4000 ppmw of water based on the total weight of the component A).

18. The two-component coatings system as claimed in claim 1, characterized in that the component A) contains ≥1400 to ≤2400 ppmw of water based on the total weight of the component A).

19. The two-component coatings system as claimed in claim 1, characterized in that the polyisocyanate is a hexamethylene diisocyanate trimer or a pentamethylene diisocyanate trimer.

* * * * *